United States Patent [19]

Ohta

[11] Patent Number: 5,677,771
[45] Date of Patent: Oct. 14, 1997

[54] DIGITAL COPIER THAT APPROXIMATES CONTOURS OF A DOCUMENT IMAGE AS STRAIGHT LINES OR CURVES

[75] Inventor: Junichi Ohta, Yokohama, Japan

[73] Assignee: Ricoh Company, Ltd., Tokyo, Japan

[21] Appl. No.: 356,125

[22] Filed: Dec. 15, 1994

[30] Foreign Application Priority Data

Dec. 15, 1993 [JP] Japan .................... 5-315409

[51] Int. Cl.⁶ ..................... H04N 1/387; G06K 9/36
[52] U.S. Cl. ................... 358/296; 358/452; 358/453; 382/283
[58] Field of Search ..................... 358/296, 448, 358/451, 452, 453, 462, 530, 532, 537, 538; 395/115, 116; 399/182, 183; 382/173–177, 195, 199, 203, 254, 256, 257, 264, 266–269, 282, 283, 307, 309–311

[56] References Cited

U.S. PATENT DOCUMENTS

| | | |
|---|---|---|
| 4,450,483 | 5/1984 | Coviello . |
| 5,235,653 | 8/1993 | Nakano et al. ............... 382/61 |
| 5,272,764 | 12/1993 | Bloomberg et al. ............ 358/453 X |
| 5,293,469 | 3/1994 | Outa et al. ................. 395/133 |
| 5,452,372 | 9/1995 | Shirasaka et al. ............ 382/199 |
| 5,459,586 | 10/1995 | Nagasato et al. ............. 358/452 X |

FOREIGN PATENT DOCUMENTS 29 20 070 11/1980 Germany .
32 31 067 3/1983 Germany .

OTHER PUBLICATIONS

"Konturorientierte Verfahren in der Digitalen Bildverarbeitung", pp. 35–46 and 56–80, 1989, H. Bassmann, et al.

Fundamentals of Digital Image Processing, pp. 357–362 and 371–374, 1989, A.K. Jain, "Image Analysis and Computer Vision".

Primary Examiner—Eric Frahm
Attorney, Agent, or Firm—Oblon, Spivak, McClelland, Maier & Neustadt, P.C.

[57] ABSTRACT

In a digital copier, a trim mode may be entered on an operating section and a particular area of a document may be marked on a marking device. As an image scanner reads the document image, the resulting image data are written to a memory unit. A data separating section separates characters lying in the marked area of the document, and then a contour separating section separates the contours of the characters. An approximating section determines whether a continuous contour line is straight or curved on the basis of the angle and length thereof and then approximates contour data to a straight line or a curve. As a result, characters are trimmed and processed such that straight lines appear sharp while curves appear smooth. A drawing section writes the approximated contour data in a memory unit and paints the inside of the contour data to thereby draw an output image in the memory unit.

6 Claims, 12 Drawing Sheets

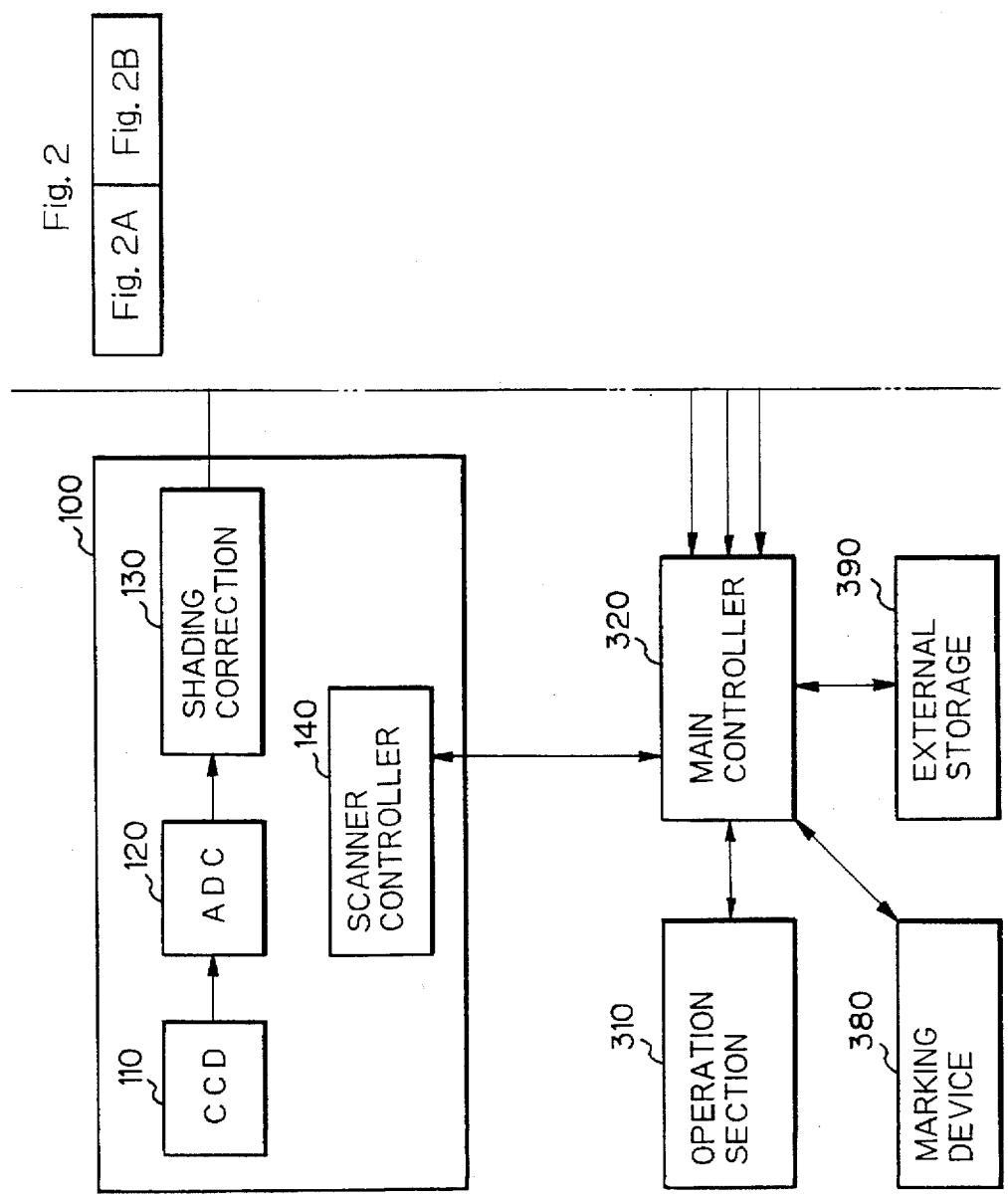

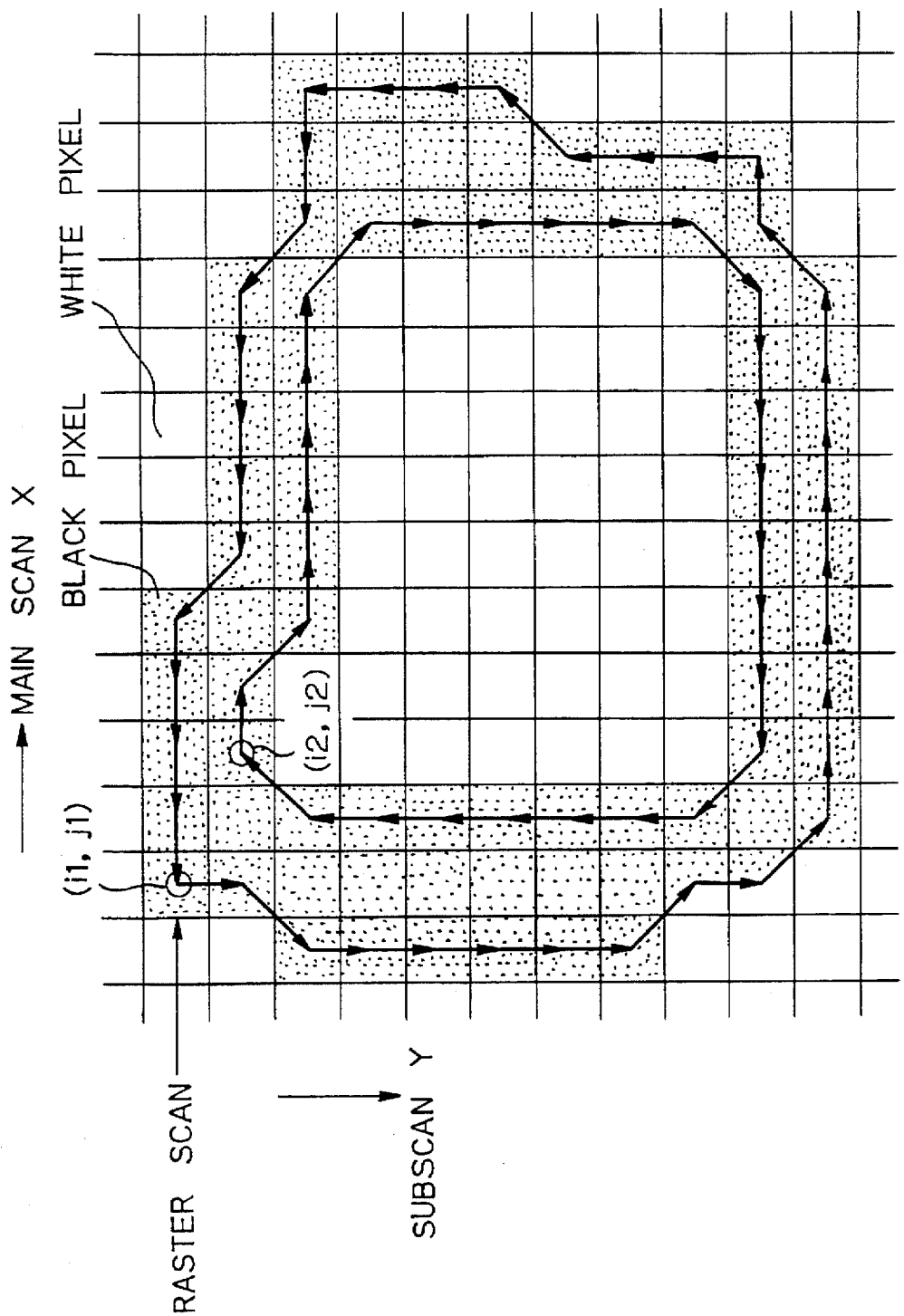

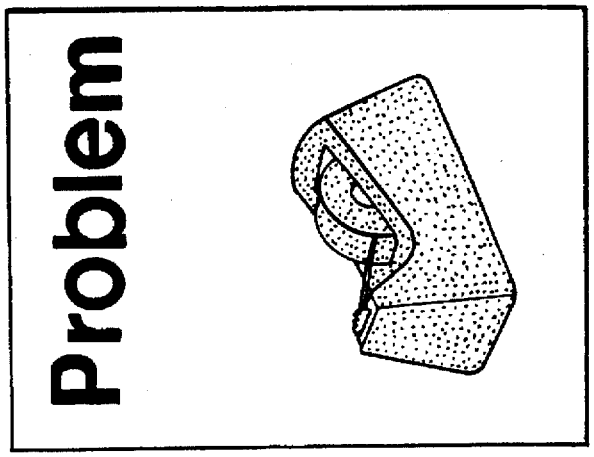
Fig. 12C
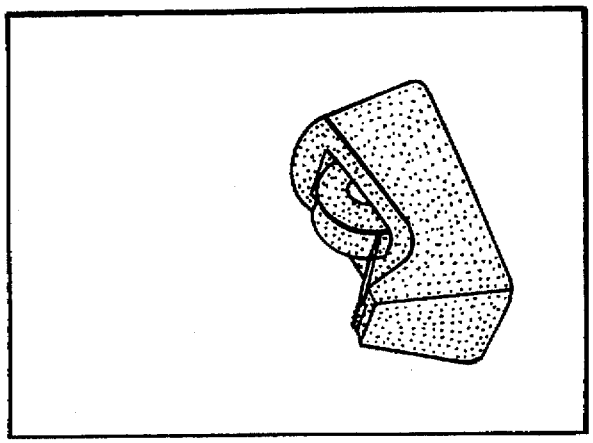
Fig. 12B
Fig. 12A

DIGITAL COPIER THAT APPROXIMATES CONTOURS OF A DOCUMENT IMAGE AS STRAIGHT LINES OR CURVES

BACKGROUND OF THE INVENTION

The present invention relates to a digital copier capable of preventing the contours of characters and figures from being degraded.

It is a common practice with a digital copier to read a document image with a scanner and print out the resulting image data on a sheet with a printer. This kind of copier can enlarge the document image in the main scanning direction by interpolating pixels in the same direction or enlarge it in the subscanning direction by changing the reading speed in the same direction.

However, the problem with the conventional digital copier is that the contours of characters and figures are degraded when they are printed on a sheet in an enlarged scale. The degradation is particularly conspicuous when a document image is enlarged by more than 400%. Although the image read by the scanner may be enlarged, deformed or otherwise processed on, for example, a computer, the data cannot be input without resorting to a complicated operation.

SUMMARY OF THE INVENTION

It is, therefore, an object of the present invention to provide a digital copier capable of enhancing the quality of characters and figures by trimming their contours.

In accordance with the present invention, a digital copier has a reading unit for reading a document image by photoelectric conversion, a designating unit for designating particular part of the document image to be processed, an image separating section for separating the designated part from the document image read by the reading unit, a contour separating section for separating the contours of the particular part separated by the image separating section, an approximating section for approximating the contours separated by the contour separating section to straight lines or curves, a drawing section for drawing the particular part by painting the inside of the contours approximated by the approximating means, and an outputting unit for outputting the particular part drawn by the drawing section on a sheet.

Also, in accordance with the present invention, a digital copier has a reading unit for reading a document image by photoelectric conversion, a designating unit for designating the size of particular part of the document image to be processed, an image separating section for separating the particular part on the basis of the size of an aggregation of continuous black pixels and the size designated by the designating unit, a contour separating section for separating the contours of the particular part separated by the image separating section, an approximating section for approximating the contours separated by the contour separating section to straight lines or curves, a drawing section for drawing the particular part by painting the inside of the contours approximated by the approximating section, and an outputting section for outputting the particular part drawn by the drawing section on a sheet.

BRIEF DESCRIPTION OF THE DRAWINGS

The above and other objects, features and advantages of the present invention will become more apparent from the following detailed description taken with the accompanying drawings in which:

FIG. 5 demonstrates line approximation to be execute by a contour separating section also shown in FIG. 3;

FIGS. 12A–12C demonstrates processing available with a combining section included in the third embodiment;

DESCRIPTION OF THE PREFERRED EMBODIMENTS

Figure 1:
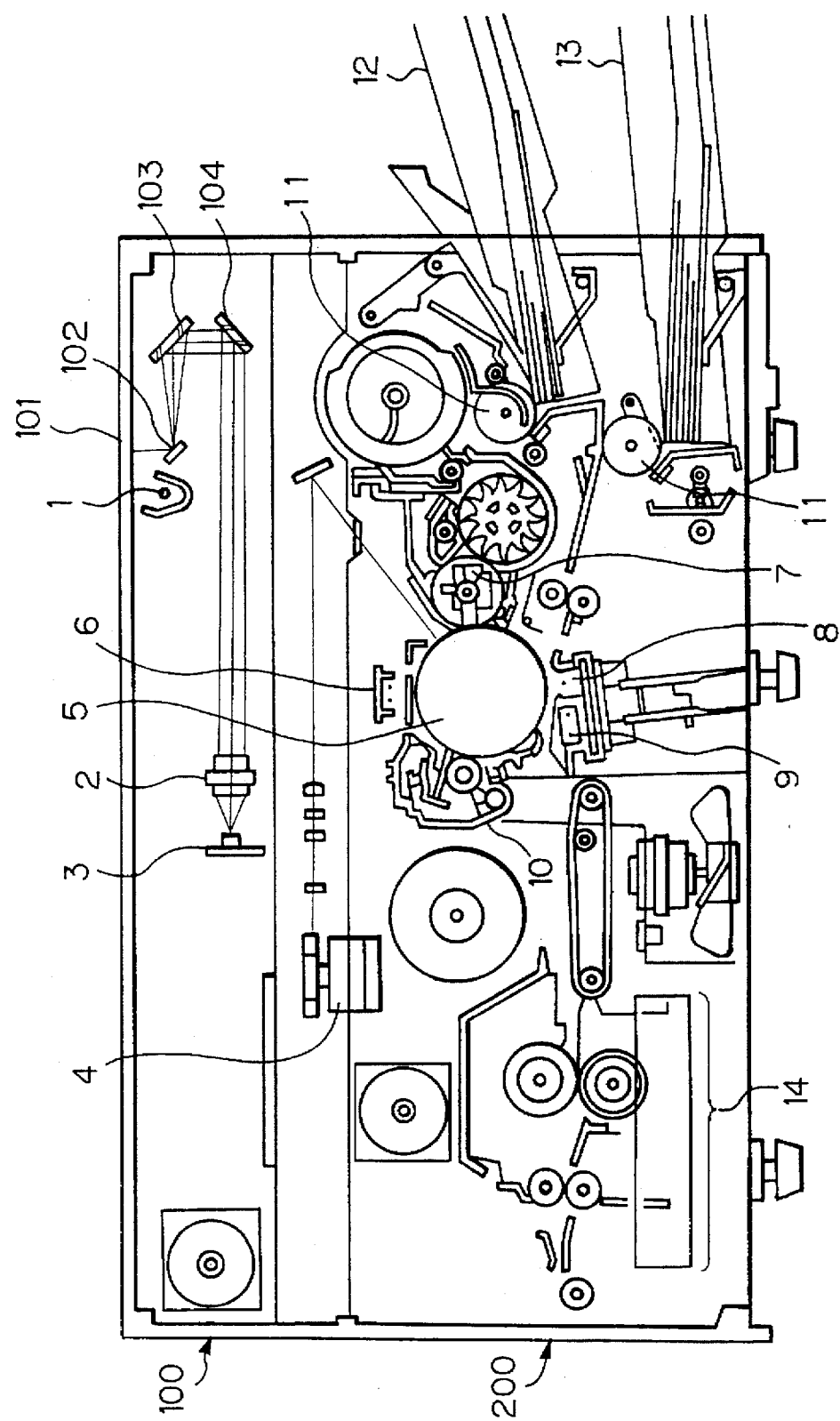
FIG. 1 is a section of a digital copier to which preferred embodiments of the present invention are applied.

Referring to FIG. 1 of the drawings, a digital copier to which preferred embodiments of the present invention are applied is shown. The copier will be described with reference also made to FIG. 2. As shown, the copier is generally made up of an image scanner 100, a memory unit 330, an image processing unit 370, and a laser printer 200. The image scanner 100 reads a document by photoelectric conversion and generate corresponding image data. The memory unit 30 and image processing unit 370 are capable of processing the image data fed thereto from the image scanner 100. The laser printer 200 prints out the processed image data on a sheet.

A glass platen 101 is mounted on the top of the image scanner 100 to be loaded with a document. Optics 1–3 and 102–104 are disposed below the glass platen 101. Specifically, when a lamp 1 illuminates a document laid on the glass platen 101, the resulting imagewise reflection is sequentially reflected by mirrors 102–104 and then incident to a light-sensitive section 3 via a lens 2. A CCD (Charge Coupled Device) image sensor 110 is located at the light-sensitive section 3 and scans the document in the main scanning direction. The optics 1–3 and 102–104 move in the right-and-left direction, as viewed in FIG. 1, so as to scan the document in the subscanning direction. As a result, the document image is read by the CCD image sensor 110 line by line.

Figure 2B:
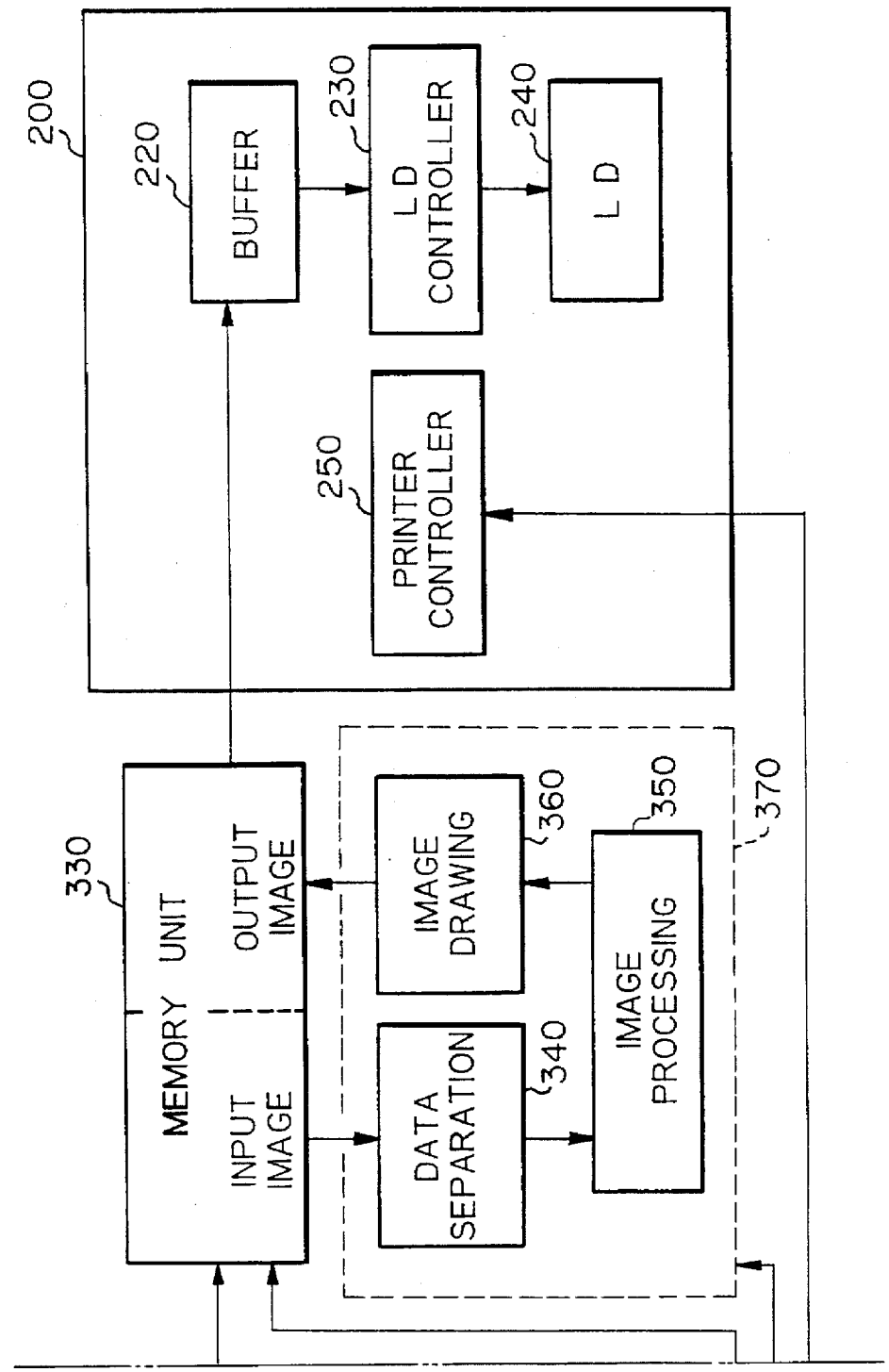
FIG. 2 is a block diagram schematically showing a system arrangement included in the copier of FIG. 1.

The system shown in FIG. 2 processes an image signal generated by the image sensor 110 and representing the document image. The laser printer 200 has a laser diode (LD) 240. A laser beam issuing from the LD 240 is modulated by the processed image data. A photoconductive drum 5 has the surface thereof uniformly charged to a predetermined high potential by a main charger 6. The laser beam is incident to the charged surface of the drum 5 by way of a writing device 4 including a polygon mirror, f-theta lens and other conventional optical elements. As a result, the potential on the drum 5 changes depending on the intensity of the laser beam, producing a potential distribution matching the image, i.e., an electrostatic latent image. The latent image is developed by a developing unit 7 to turn out a toner image.

A sheet is selectively fed from a cassette 12 or 13 by a pick-up roller 11 and conveyed such that it meets the toner image formed on the drum 5. A transfer charger 8 transfers the toner image from the drum 5 to the sheet. A separation charger 9 separates the sheet from the drum 5. The sheet carrying the toner image thereon has the toner image fixed by a fixing unit 14. Finally, the sheet is driven out of the copier as a copy sheet. After the image transfer, the surface of the drum 5 is cleaned by a cleaning unit 10 to prepare for the next image forming cycle.

In the image scanner 100, the CCD image sensor, e.g., color CCD image sensor 110 reads the document image in a bit map format under the control of a scanner controller 140. An analog-to-digital converter (ADC) 120 transforms the resulting image signal from the image sensor 110 to a digital signal. A shading correction 130 corrects the irregularities of the digital signal in pixel-by-pixel density level. The output of the shading correction 130 is written to the memory unit 330.

The image processing unit 370 processes input image data stored in the memory unit 330 to trim the contours of characters or figures and delivers the processed image data to the laser printer 200 as output image data, as will be described in detail later. The output image data written to the memory unit 330 are applied to the laser printer 200 in the form of bilevel data (black and white) on a pixel basis. The LD 240 is driven via a buffer 220 and an LD driver 230 under the control of a printer controller 250. Consequently, a laser beam modulated by the output image data is emitted from the LD 240, so that the writing device 4, FIG. 1, scans the surface of the drum 5.

An operating section 310 and a marking device 380 are provided on the top of the copier shown in FIG. 1. The operating section 310 has various keys, including a trim mode key, and various indicators. The marking device 380 may be implemented by a tablet and a pen and allows desired part of a document to be marked thereon. A main controller 320 controls various kinds of display on the operating section 310 and reads key inputs to command the scanner controller 140, memory unit 330, image processing unit 370, printer controller 250 and so forth to start reading a document, start outputting image data and perform other various kinds of operations. An external storage 390 is implemented as a floppy disk drive (FDD) or a hard disk drive (HDD) and can store the image data from the image processing unit 370, as desired.

In the image processing unit 370, a data separation 340 separates, among the input image data stored in the memory unit 330, the data lying in a marked area. An image processing 350 trims and processes the contours of characters or figures lying in the separated area. A image drawing 360 draws the image processed by the image processing 350 in the memory unit 330.

Figure 3:
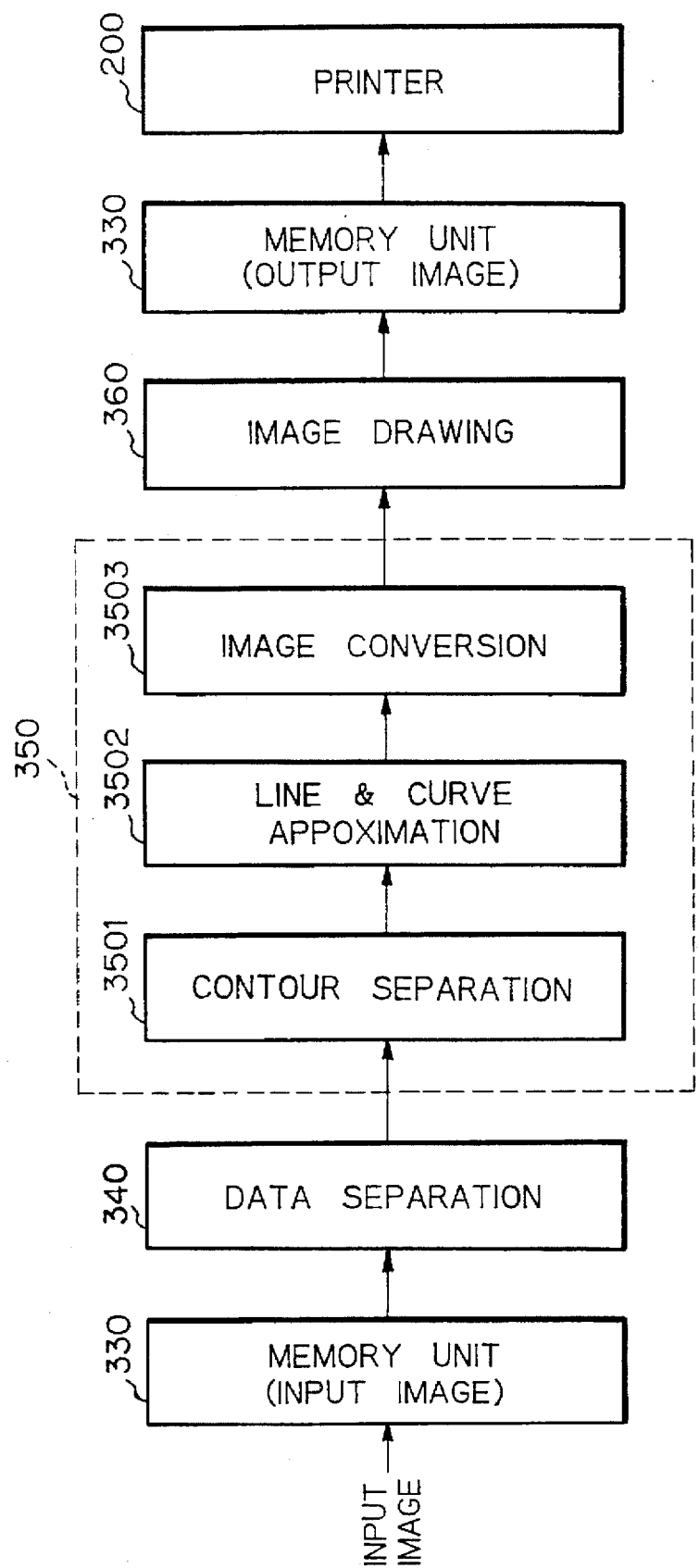
FIG. 3 is a block diagram schematically showing essential part of a first and a second embodiment of the present invention.
Figure 4C:
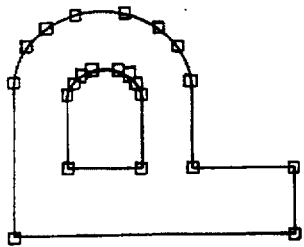
FIGS. 4A–4E show a specific image to be processed by a processing section shown in FIG. 3.
Figure 4B:
Figure 4E:
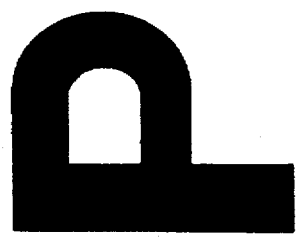
Figure 4A:
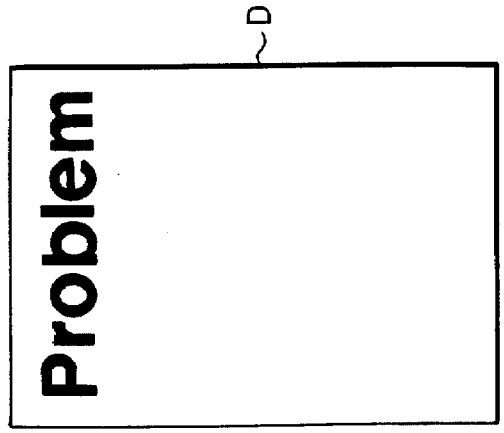
Figure 4D:
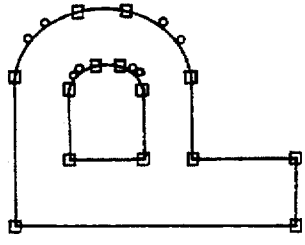

A first embodiment of the digital copier in accordance with the present invention will be described with reference to FIG. 3 as well as to FIGS. 1–2 and 4–8. Assume that a trim mode is selected on the operating section 310, and that a desired area of a document is marked on the marking device 380. Then, the image scanner 100 reads the document, and the resulting image data are written to the memory unit 330. The data separation 340 separates only characters or figures lying in the marked area, while removing noise, photograph or similar halftone portion and mesh portion. For example, as shown in FIG. 4A, assume that the area of a document D containing characters "Problem" is marked. Then, the data separation 340 separates such characters. Subsequently, a contour separation 3501, FIG. 3, separates the contours of the characters. FIG. 4B shows a character "P" having jagged edges due to digital noise by way of example. The contour separation 3501 separates such contour data of a character "P", as shown in FIG. 4C. A line and curve approximation 3502 determines whether or not a contour line is straight or curved on the basis of the angle and length thereof and, as shown in FIG. 4D, approximates the contour data. As a result, straight lines appear sharp while curves appear smooth.

The drawing 360 writes the approximated contour data in the memory unit 330 and paints the area delimited by such contour data, thereby drawing an output image in the memory unit 330. When the image with trimmed contour is printed on a sheet by the laser printer 200, the character has sharp straight lines and smooth curves, as shown in FIG. 4E. In this manner, the contours of characters or figures can be trimmed and processed by a simple operation, so that high image quality is achievable. It is noteworthy that the illustrative embodiment processes only the area of a document marked by the marking device 380 and, therefore, reduces the processing time.

The procedures for separating contours and approximating them to straight lines and curves will be described in detail.

(1) Contour Separation

As shown in FIG. 5 specifically, input image is scanned by raster scanning in order to search for a black pixel where a trace should begin. The pixel for starting a trace refers to a black pixel not traced yet and surrounded by eight pixels (directions "0" to "7" shown in FIG. 6) at least one of which is a white pixel. In FIG. 5, a pixel (i1, j1) is found to be the trace start pixel and determined to represent an outer contour line since the immediately preceding pixel in the raster scanning direction is a white pixel. A trace begins at the pixel (i1, j1) and proceeds in the counterclockwise direction. As the counterclockwise trace returns to the trace start pixel (i1, j1), the trace ends. If the pixel at the left of the trace start pixel (immediately preceding the latter in the raster scanning direction) is a black pixel, it will be determined to represent an inner contour.

Figure 6:
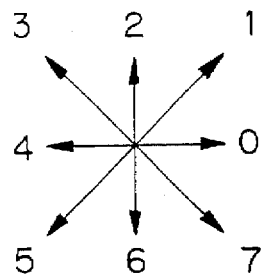
FIG. 6 shows specific directions in which contour lines shown in FIG. 5 extend.

Specifically, surrounding pixels are sequentially examined in the counterclockwise direction, starting at the direction "4" of FIG. 6. The direction of a black pixel found first is determined to be the direction of a contour line. Subsequently, the contour center pixel is shifted to the black pixel found first, and then adjoining pixels are examined counterclockwise from a direction which is (direction of last contour line-2). This is repeated until the trace returns to the trace start pixel. Such a procedure successfully traces the contour lines represented by loops in FIG. 5, as determined by experiments.

The result of the trace described above is written to a memory in the form of a series of contour direction codes (see FIG. 7) and the start positions and lengths of contour loops. The lengths of contour loops represent the size of an aggregation of black pixels.

(2) Line & Curve Approximation

Figure 7:
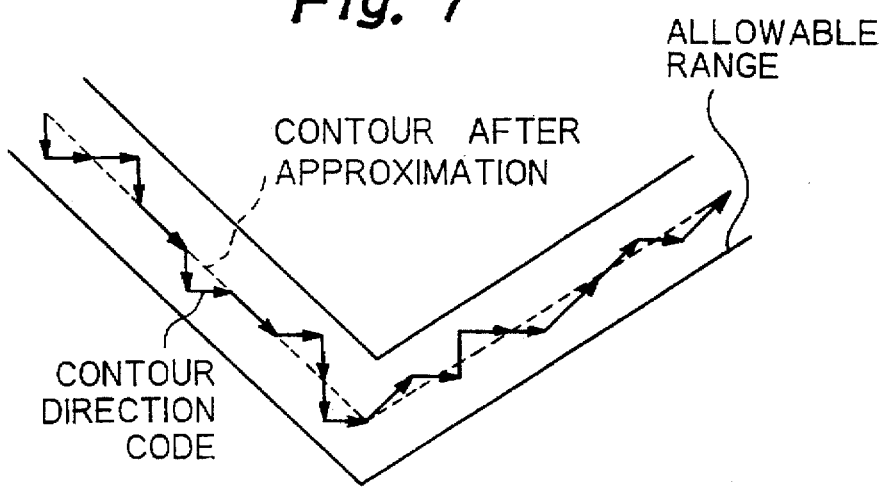
FIG. 7 shows the contour data of FIG. 5 and line approximation.

By the above procedure (1), chain code data representing a contour are produced (data represented by the direction codes "0" to "7" of FIG. 6). To approximate a contour to a straight line, part of such chain code data which is continuous is replaced with a longer straight line while being combined within an allowable error range. As shown in FIG. 7 specifically, assume that the contour chain code are sequentially traced from a given contour point to the end of a line. Then, if the difference between the contour points existing between the start contour point and the end point of the line and a straight line does not exceed an allowable difference, the contour can be approximated to a straight line. This successfully absorbs digital noise particular to contours and reduces the amount of data representing contours.

Figure 8:
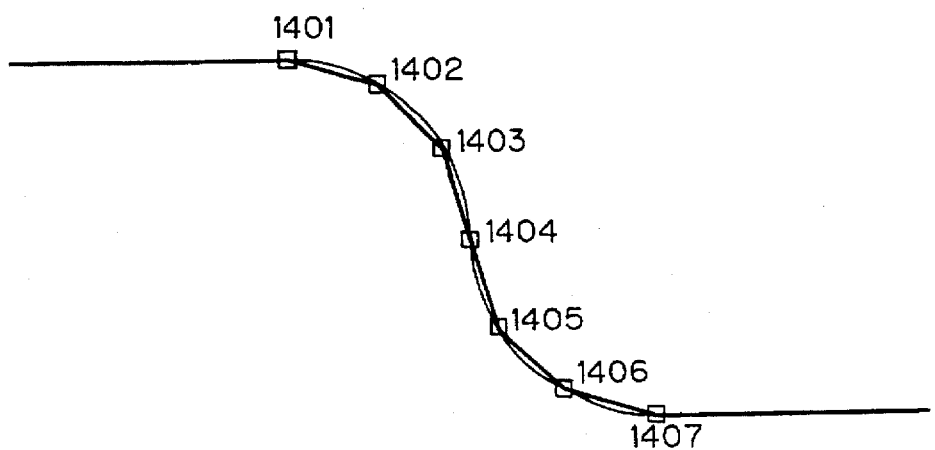
FIG. 8 demonstrates curve approximation to be executed by a line and curve approximating section shown in FIG. 3.

FIG. 8 shows a curve approximation procedure specifically. As shown, part of continuous segments which has three or more segments shorter than a predetermined threshold is approximated to a free curve passing through the end points of such part. In this case, points 1401, 1404 and 1407 are the end points of the resulting curves while points 1402, 1403, 1405 and 1406 are the points lying on such curves.

Figure 9B:
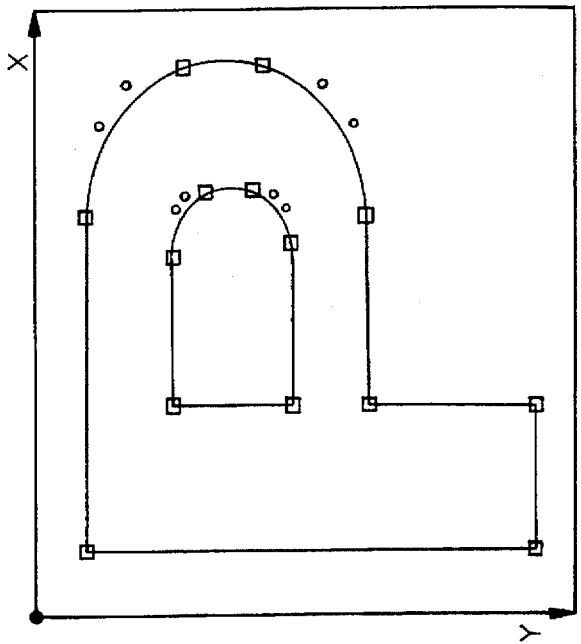
FIGS. 9A, 9B, and 9C show processing available with an image converting section also shown in FIG. 3.
Figure 9A:
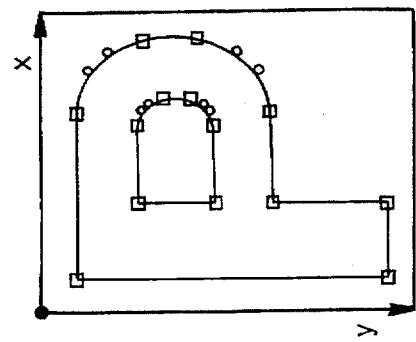
Figure 9C:
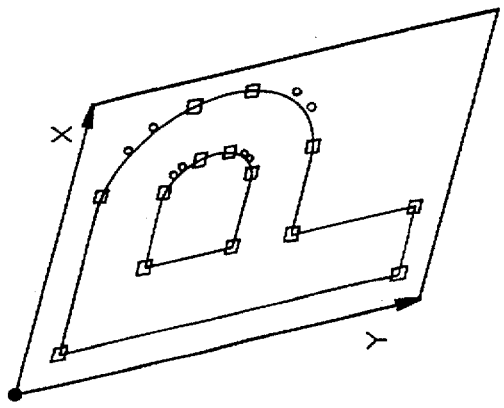

A second embodiment of the present invention will be described hereinafter. First, the contour separation 3501 separates the contours of the characters, as in the first embodiment. FIG. 4B shows a character "P" having jagged edges due to digital noise by way of example. The contour separation 3501 separates such contour data of a character "P", as shown in FIG. 4C. The line and curve approximation 3502 determines whether or not a contour line is straight or curved on the basis of the angle and length thereof and, as shown in FIG. 4D, approximates the contour data. As a result, straight lines appear sharp while curves appear smooth. This embodiment additionally includes an image conversion 3503, FIG. 3. FIG. 9A shows the coordinates system of specific contour data. In response to a command entered on the operating section 310, the image conversion 3503 transforms the coordinates system of FIG. 9A to, for example, a horizontally enlarged coordinates system shown in FIG. 9B or an oblique coordinates system shown in FIG. 9C. The drawing 360 draws the contour data of the transformed coordinates system in the memory unit 330 and, at the same time, paints the inside of the contour data. As a result, an output image is drawn in the memory unit 330. With this embodiment, it is possible not only to trim and process characters and figures but also to ornament or otherwise accentuate them.

Figure 10A:
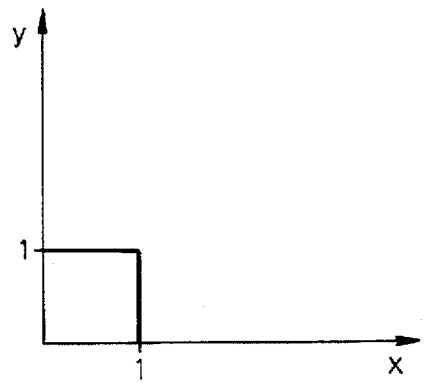
FIGS. 10A and 10B show an example of the processing shown in FIGS. 9A, 9B, and 9C.
Figure 10B:
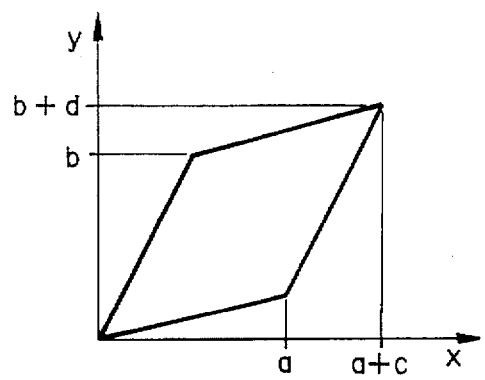

Regarding the image conversion 3503, contour data after line and curve approximation can be represented by coordinates. Hence, the deformation of the contour data can be produced by simple equations. For example, enlargement, reduction, rotation, deformation or similar conversion can be expressed as:

$$X=ax+by$$

$$Y=cx+dy$$

where (x, y) is the coordinates before conversion and (X, Y) is the coordinates after conversion. A unit square shown in FIG. 10A specifically may be converted to a rhomb shown in FIG. 10B.

Figure 11:
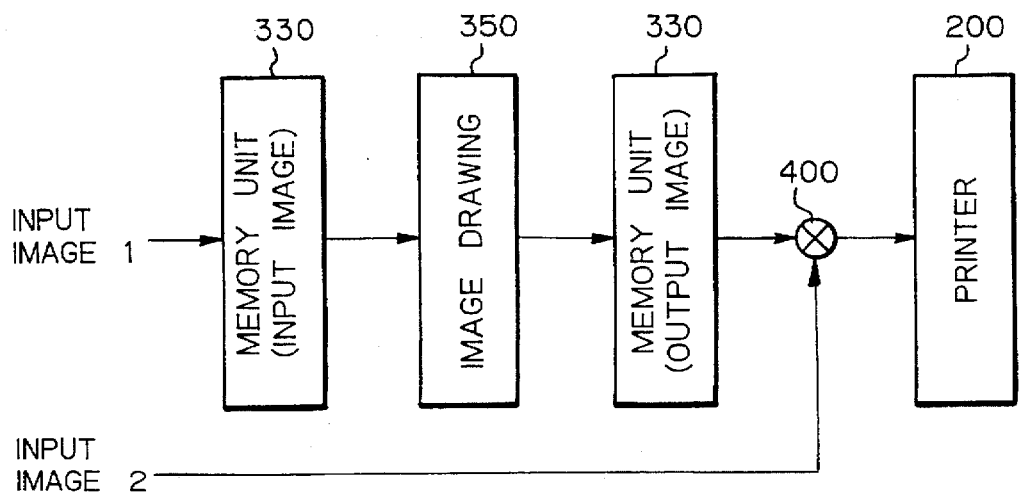
FIG. 11 is a block diagram schematically showing a third embodiment of the present invention.

A third embodiment of the present invention is shown in FIG. 11. As sown, a mixer 400 combines the processed image with another image read by the scanner 100 independently of the processed image. For example, the mixer 400 combines the trimmed characters shown in FIG. 12A with another figure shown in FIG. 12B so as to produce a composite image shown in FIG. 12C.

Figure 13:
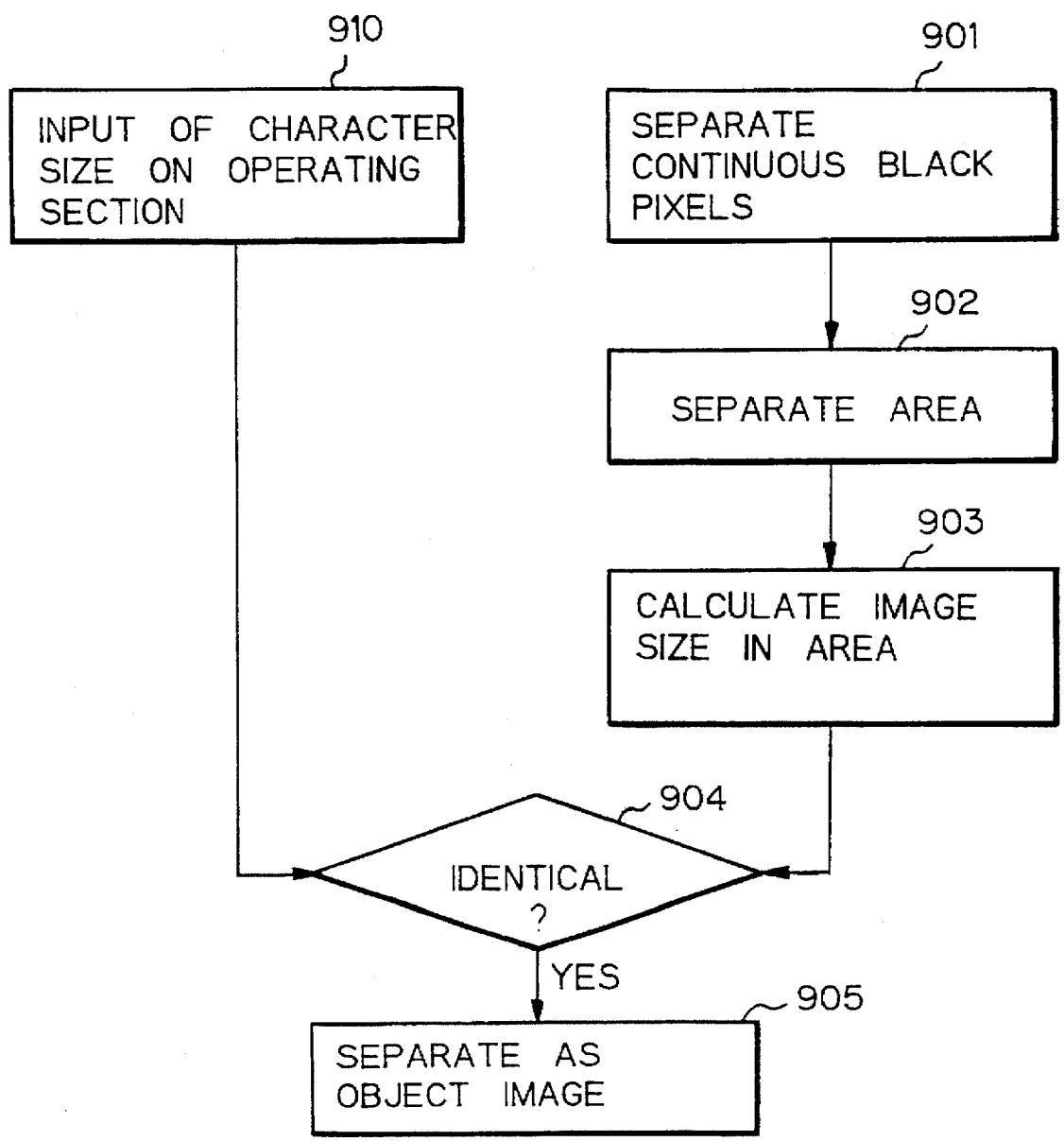
FIG. 13 is a flowchart representing an image separation procedure particular to a fourth embodiment of the present invention.
Figure 14B:
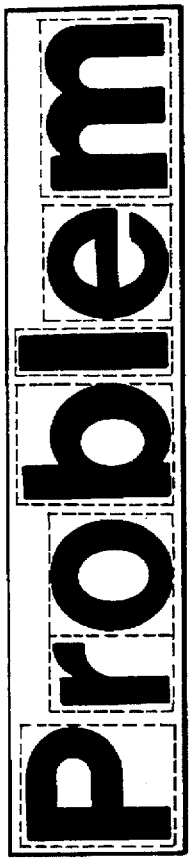
FIGS. 14A–14C show the image separation procedure of FIG. 13 specifically.
Figure 14C:
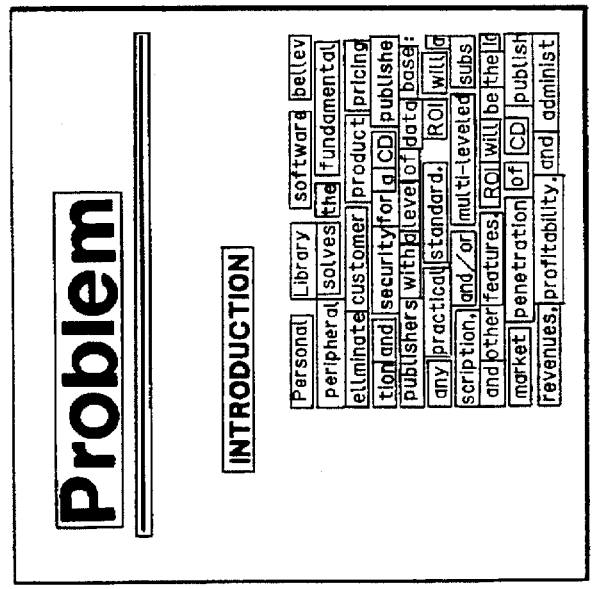
Figure 14A:
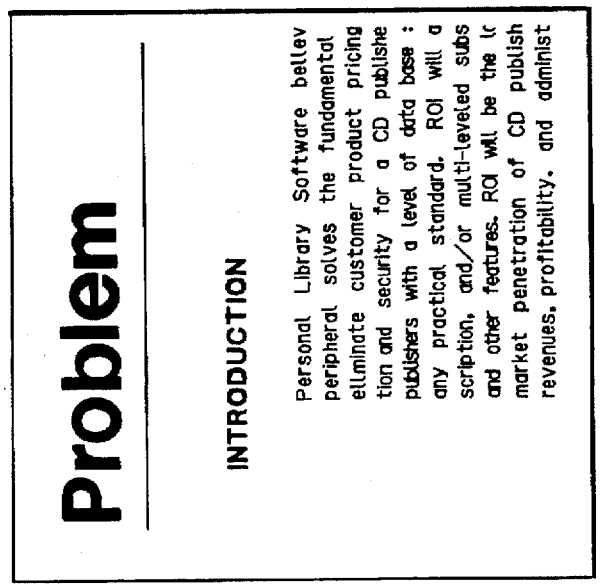

A fourth embodiment of the present invention will be described with reference to FIG. 13. As shown in FIG. 3, a desired character size to be processed is entered on the operating section 310 (step 910). Subsequently, the scanner reads a document image shown in FIG. 14A by way of example. After image data representing the document image have been written to the memory unit 330, the data separation 340 searches for aggregations of continuous black pixels and then separates smallest rectangles containing the respective aggregations, as indicated by dashed lines in FIG. 14B specifically (step 901). Subsequently, areas in which such smallest rectangles adjoin each other at a distance smaller than a predetermined value are separated, as shown in FIG. 14C (step 902). Then, in each of such areas, the greatest value is calculated and determined to be the image size of the area (step 903). Thereafter, each image size is compared with the character size. As a result, characters matching the desired size are separated and processed. This embodiment, therefore, allows the operator to designate a desired object on the operating section 310, e.g., on numeral keys, instead of using the marking device 380.

In any of the embodiments shown and described, the processed image may be stored in the FDD, HDD or similar external storage 390 or sent to a terminal over a network, as desired. Hence, it is possible to transfer the image from the copier to a graphic data processing apparatus and subject it to more advanced editing.

In summary, it will be seen that the present invention provides a digital copier having various unprecedented advantages, as enumerated below.

(1) The copier separates designated part of a document image, separates the inner and outer contours of the designated part, approximates the contours to straight lines or curves, and then paints the area delimited by the contours. Hence, only if desired part of an image is marked, characters or figures can have their contours trimmed and and processed and then output with high quality.

(2) The copier separates particular part of a document image whose size is designated, separates the contours of the designated part, approximates the contours to straight lines or curves, and then paints the area delimited by the contours. Hence, if the size of desired part of an image is entered, characters or figures can have their contours trimmed and processed and then output with high quality.

(3) Since the copier can deform desired part of a document image by changing the coordinates system of contours, it is possible to deform the trimmed and processed characters or figures in order to further enhance the image quality.

(4) Since the copier can combine the trimmed and processed image with another document image, it is possible to trim characters or figures and then combine them with another image by a simple operation.

Various modifications will become possible for those skilled in the art after receiving the teachings of the present disclosure without departing from the scope thereof.

What is claimed is:

1. A digital copier comprising:
   reading means for reading a document image by photoelectric conversion;
   designating means for designating a particular part of said document image to be processed;
   image separating means for separating said particular part from said document image read by said reading means;
   contour separating means for separating contours of said particular part separated by said image separating means;

approximating means for approximating said contours separated by said contour separating means as straight lines or curves;

drawing means for drawing said particular part by painting an inside of said contours approximated by said approximating means; and outputting means for outputting said particular part drawn by said drawing means on a sheet.

2. A digital copier as claimed in claim 1, further comprising deforming means for deforming said contours by changing a coordinate system of said contours approximated by said approximating means, said drawing means drawing said particular part by painting an inside of contours having a changed coordinate system.

3. A digital copier as claimed in claim 1, further comprising combining means for combining said particular part drawn by said drawing means with another document image read by said reading means.

4. A digital copier comprising:

reading means for reading a document image by photoelectric conversion;

designating means for designating a size of a particular part of said document image to be processed;

image separating means for separating said particular part based on a size of an aggregation of continuous black pixels and said size designated by said designating means;

contour separating means for separating contours of said particular part separated by said image separating means;

approximating means for approximating said contours separated by said contour separating means as straight lines or curves;

drawing means for drawing said particular part by painting an inside of said contours approximated by said approximating means; and outputting means for outputting said particular part drawn by said drawing means on a sheet.

5. A digital copier as claimed in claim 4, further comprising deforming means for deforming said contours by changing a coordinate system of said contours approximated by said approximating means, said drawing means drawing said particular part by painting an inside of contours having a changed coordinate system.

6. A digital copier as claimed in claim 4, further comprising combining means for combining said particular part drawn by said drawing means with another document image read by said reading means.

* * * * *